June 9, 1942.  E. D. CLICKNER  2,285,493
FISHING REEL
Filed Aug. 1, 1940
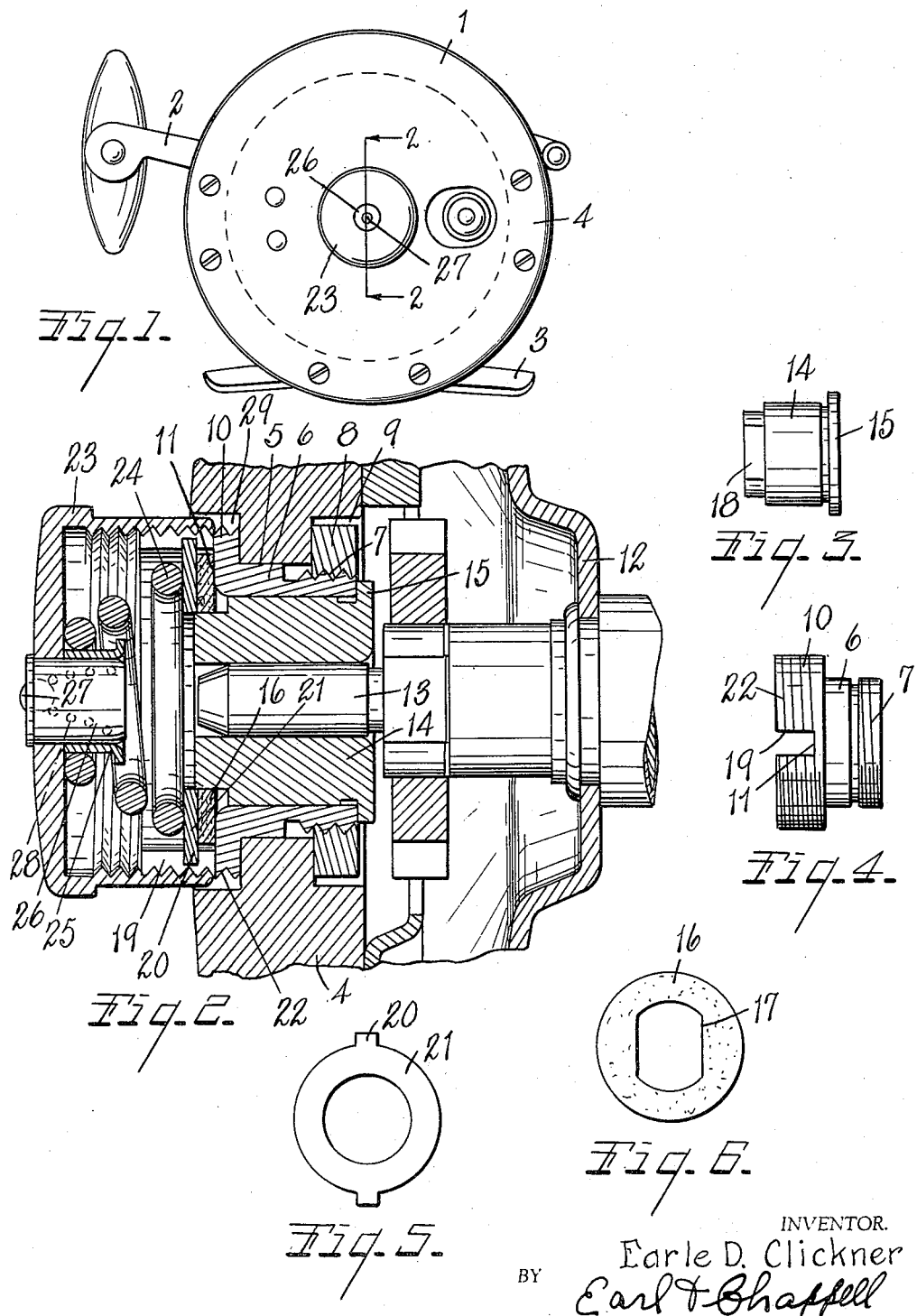
INVENTOR.
Earle D. Clickner
BY Earl T Chappell
ATTORNEYS Patented June 9, 1942

2,285,493

UNITED STATES PATENT OFFICE 2,285,493

FISHING REEL

Earle D. Clickner, Kalamazoo, Mich., assignor to Shakespeare Company, Kalamazoo, Mich., a corporation of Michigan Application August 1, 1940, Serial No. 349,077

13 Claims. (Cl. 242—84.5)

This invention relates to improvements in fishing reels.

The main objects of this invention are:

First, to provide a fishing reel with an improved drag means which is effective in preventing overrunning of the reel in normal operation thereof and which has a wide range of adjustment to meet various conditions and requirements.

Second, to provide a fishing reel having these advantages which is well adapted for surf fishing and the like.

Third, to provide a structure having these advantages which is very compact and simple in its parts and in the arrangement and assembly thereof.

Objects relating to details and economies of the invention will appear from the description to follow. The invention is defined and pointed out in the claims.

A preferred embodiment of the invention is illustrated in the accompanying drawing, in which:

Fig. 1 is an elevation of the tail end of a fishing reel embodying my invention.

Fig. 2 is an enlarged fragmentary view mainly in section on line 2—2 of Fig. 1.

Fig. 3 is a side elevation of the spool spindle journal member.

Fig. 4 is a side elevation of the bearing member.

Fig. 5 is a plan view of the friction disk which is splined to the bearing member.

Fig. 6 is a plan view of the friction disk which is splined to the journal member.

In the accompanying drawing, 1 designates the frame of a fishing reel generally and 2 the crank thereof. The frame is provided with the usual reel seat 3. A complete reel frame is not shown as that is not deemed necessary for an understanding of the present invention.

The frame end member or tail end member 4 is provided with an opening 5 receiving the bearing 6. This frame member 4 may be formed of non-metallic materials, as Bakelite or other suitable plastic materials.

The bearing 6 has an externally threaded portion 7 at its inner end receiving the retaining nut 8, the retaining nut being disposed in the recess 9 in the frame member. The bearing has an enlarged outer portion 10 which constitutes a shoulder seating against the end member so that the nut clamps the bearing securely to the frame member. The bearing is provided with an annular outwardly facing frictional surface 11, the purpose of which will later appear.

The spool 12 is provided with a spindle portion 13 on which I mount the enlarged journal member 14. This journal member is preferably a drive or forced fit on the spindle 13 so that it is secured to the spindle to rotate therewith. The journal member has an outwardly projecting flange 15 at its inner end.

It will be noted that the bearing 6 and the journal member 14 are of large diameter relative to the spindle to which the journal member is attached so that in the normal operation of the reel the journal and its bearing constitute substantial frictional drag means for retarding the rotation of the spool, and that is taking into consideration the spool, the line thereon, and normally a bait so that, for example when a cast is made, the friction is such that there is normally no over-running and consequent entangling of the line. In surf fishing, for example, it is frequently desired to vary the drag and it may be desired to vary the drag for other conditions.

In my present invention I provide a friction disk 16 which preferably is of hard fiber or other friction material and this has a non-circular opening 17 engaging the flattened parts 18 on the journal member, thereby providing a splined engagement for the disk or friction member with the journal.

The bearing is provided with longitudinal slots 19 which receive the lugs 20 on the friction disk 21, thereby providing splined engagement for the disk with the bearing and securing it against rotation in coacting relation to the disk 16.

The bearing is externally threaded at 22 to receive the cap 23 which constitutes a support for the helically coiled spring 24, the larger end of which is in thrust engagement with the disk 21, the outer end in thrust engagement with the end of the cap being held in position by means of the collar 25 surrounding the oil cup 26 which is arranged through the end of the cap to project into the cap.

The oil receiving opening in the end of the cap is closed by a ball, indicated at 27, supported by the spring, indicated at 28. The cap extends into the annular recess 29 formed in the frame end member 4.

With the parts thus arranged, the reel spool bearing provides a normal frictional drag for the spool which is of very decided advantage. However, it is sometimes desirable to vary the drag or to increase the drag over this amount incident to the enlarged bearing features described, and this I accomplish by the variable friction disk drag means described. It will be noted that there is no end thrust on the spool which is a desirable feature, particularly in larger reels such as surf reels.

I have illustrated and described my improvements in an embodiment which I find highly satisfactory. I have not attempted to illustrate or describe certain other embodiments or adaptations, as it is believed that this disclosure will enable those skilled in the art to embody or adapt my improvements as may be desired.

Having thus described my invention, what I claim as new and desire to secure by Letters Patent is:

1. In a fishing reel, the combination with a frame comprising an end member having a bearing receiving opening, of a bearing disposed in said opening and having an externally threaded enlargement at its outer end and an outwardly facing annular friction surface within said enlargement, a retaining nut threaded upon the inner end of said bearing, said end member being recessed on its inner side to receive said retaining nut, a spool provided with a spindle, a sleeve-like journal member mounted on said spindle for rotation therewith within said bearing and having a flange at its inner end engaging the inner end of said bearing, said bearing and journal member being of such large diameter relative to the spindle to which the journal member is attached whereby to act to normally constitute substantial drag means for retarding rotation of the spool in normal use of the reel, a friction disk having splined engagement with said journal member coacting with the said outwardly facing surface on said bearing, a friction disk coacting with said friction disk splined to said journal member and having splined engagement with said bearing, a cap having threaded engagement with the outer end of said bearing, and a helically coiled spring arranged within said cap with its larger end in engagement with said last named friction disk, said cap being provided with an oil cup support constituting a centering means for the outer end of said spring.

2. In a fishing reel, the combination with a frame comprising an end member having a bearing receiving opening, of a bearing disposed in said opening and having an externally threaded enlargement at its outer end and an outwardly facing annular friction surface within said enlargement, a spool provided with a spindle, a sleeve-like journal member mounted on said spindle for rotation therewith within said bearing and having a flange at its inner end engaging the inner end of said bearing, said bearing and journal member being of such large diameter relative to the spindle to which the journal member is attached whereby to act to normally constitute substantial drag means for retarding rotation of the spool in normal use of the reel, a friction disk having splined engagement with said journal member coacting with the said outwardly facing surface on said bearing, a friction disk coacting with said friction disk splined to said journal member and having splined engagement with said bearing, a cap having threaded engagement with the outer end of said bearing, and a spring arranged within said cap to coact with said friction disks.

3. In a fishing reel, the combination with a frame comprising an end member having a bearing receiving opening, of a bearing disposed in said opening and having an externally threaded enlargement at its outer end and an outwardly facing annular friction surface within said enlargement, a retaining nut threaded upon the inner end of said bearing, a spool provided with a spindle, a sleeve-like journal member mounted on said spindle for rotation therewith within said bearing, said bearing and journal member being of such large diameter relative to the spindle to which the journal member is attached whereby to act to normally constitute substantial drag means for retarding rotation of the spool in normal use of the reel, a friction disk having splined engagement with said journal member and coacting with the said outwardly facing friction surface of said bearing, a friction disk coacting with said friction disk splined to said journal member and having splined engagement with said bearing, a spool cap having threaded engagement with the outer end of said bearing, and a spring arranged within said cap to coact with said friction disks.

4. In a fishing reel, the combination with a frame comprising an end member having a bearing receiving opening, of a bearing disposed in said opening and having an externally threaded enlargement at its outer end and an outwardly facing annular friction surface within said enlargement, a spool provided with a spindle, a sleeve-like journal member mounted on an end of said spindle for rotation therewith within said bearing, said bearing and journal member being of substantially larger diameter than the end of the spindle to which the journal member is attached whereby to act to normally constitute substantial drag means for retarding rotation of the spool in normal use of the reel, a friction disk having splined engagement with said journal member and coacting with the said outwardly facing friction surface of said bearing, a friction disk coacting with said friction disk splined to said journal member and having splined engagement with said bearing, a spool cap having threaded engagement with the outer end of said bearing, and a spring arranged within said cap to coact with said friction disks.

5. In a fishing reel, the combination with a frame, of a spool provided with a spindle having a relatively large journal member secured on the end thereof, a bearing for said journal member, said journal member and bearing being of substantially larger diameter than the end of the spindle on which it is secured and acting to normally constitute a substantial frictional drag retarding means for the spool, said bearing being provided with an outwardly facing friction surface, a friction disk coacting with said friction surface and having splined engagement with said journal, a coacting non-rotatable friction disk having splined engagement with said bearing, a spring having thrust engagement with said last named friction disk, and a cap having threaded engagement with said bearing and constituting an adjusting member for stressing said spring.

6. In a fishing reel, the combination with a frame, of a spool provided with a spindle having a relatively large journal member secured on its end, a bearing for said journal member, said journal member and bearing being of substantially larger diameter than the end of the spindle on which the journal member is secured whereby they act to constitute in the normal operation of the reel a substantial frictional drag retarding means for the spool, said bearing being provided with an outwardly facing friction surface, a friction disk coacting with said friction surface and having splined engagement with said journal, a coacting non-rotatable friction disk having splined engagement with said bearing, a spring having thrust engagement with said last named friction disk, and an adjusting member for stressing said spring.

7. In a fishing reel, the combination with a frame, of a spool bearing on said frame, a spool provided with a spindle having a journal member telescoped concentrically thereon for rotation therewith within said bearing, said bearing and journal member being of diameter substantially greater than the portion of the spindle on which the journal member is telescoped so as to constitute substantial drag means for retarding rotation of the spool in normal use of the reel, a friction member having splined engagement with said journal member and coacting with a relatively fixed friction surface, a friction member coacting with said friction member splined to said journal member and having splined engagement with said bearing, a cap having threaded engagement with the outer end of said bearing, and a spring arranged within said cap to coact with said friction members.

8. In a fishing reel, the combination with the frame, of a spool provided with a spindle having an enlarged journal member telescoped concentrically thereon, said frame being provided with a bearing for said journal member, the diameter of said journal member and bearing being substantially greater than the portion of the spindle on which the journal member is telescoped so as to constitute substantial frictional drag means for the spool in the normal operation of the reel, a cap having threaded adjustment on said bearing, coacting friction disks having splined engagement with said bearing and with said journal respectively, said bearing being provided with a friction surface with which the friction disk splined to said journal coacts, and a spring operatively associated with said friction disk and cap whereby the spool retarding frictional drag of the spool journal member and bearing may be variably supplemented.

9. In a fishing reel, the combination with a frame, of a spool provided with a spindle having an enlarged journal member telescoped concentrically thereon, said frame being provided with a bearing for said journal member, the diameter of said journal member and bearing being substantially greater than the portion of the spindle on which the journal member is telescoped so as to constitute substantial frictional drag means for the spool in the normal operation of the reel, coacting friction disks having splined engagement with said bearing and with said journal respectively, a spring operatively associated with said friction disks and whereby the spool retarding frictional drag of the spool journal member and bearing may be variably supplemented, and means for adjusting said spring.

10. In a fishing reel, the combination with a frame, a spool provided with a spindle having a journal member telescoped concentrically thereon for rotation therewith, a bearing on said frame for said journal member, said journal member and bearing being of substantially greater diameter than the portion of the spindle on which the journal member is telescoped and acting to normally constitute frictional drag means for substantially retarding the spool in the normal operation of the reel, coacting friction members having splined engagement with said journal member and bearing member respectively, a spring coacting with said friction members, and an adjustable member for stressing said spring.

11. In a fishing reel, the combination with a frame, a spool provided with a spindle having a journal member telescoped concentrically thereon for rotation therewith, a bearing on said frame for said journal member, said journal member and bearing being of substantially greater diameter than the portion of the spindle on which the journal member is telescoped and acting to normally constitute frictional drag means for substantially retarding the spool in the normal operation thereof, coacting friction members one of which has splined engagement with said journal member, and means for variably adjusting the said friction members.

12. In a fishing reel, the combination of a frame comprising an end member having a bearing receiving opening, of a bearing disposed in said opening having an externally threaded enlargement at its outer end and an outwardly facing annular friction surface concentric with said enlargement and disposed radially inwardly thereof, a spool provided with a spindle, a sleeve-like journal member telescoped concentrically on an end of said spindle and fixed thereto for rotation therewith in said bearing, the coacting surfaces of said bearing and journal member being substantially greater in diameter than the end of the spindle to which the journal member is attached whereby to normally constitute substantial drag means for retarding rotation of the spool in normal use of the reel, a friction disk rotatable with said journal member coacting with said outwardly facing friction surface of said bearing, a friction disk secured to said bearing and coacting with said first named friction disk, a cap having threaded adjusting engagement with the enlargement of said bearing, and a spring within said cap axially coacting with said friction disks to urge the same axially relative to said surface.

13. In a fishing reel, the combination of a frame comprising an end member having a bearing receiving opening, of a bearing disposed in said opening having an outwardly facing friction surface, a spool provided with a spindle, a sleeve-like journal member telescoped concentrically on an end of said spindle and fixed thereto for rotation therewith in said bearing, the coacting surfaces of said bearing and journal member being substantially greater in diameter than the end of the spindle to which the journal member is attached whereby to normally constitute substantial drag means for retarding rotation of the spool in normal use of the reel, friction means on said journal member coacting with said outwardly facing friction surface of said bearing, and axial thrust means coacting with said friction means to urge the same axially relative to said surface.

EARLE D. CLICKNER.